US006629188B1

United States Patent
Minkin et al.

(10) Patent No.: US 6,629,188 B1
(45) Date of Patent: Sep. 30, 2003

(54) CIRCUIT AND METHOD FOR PREFETCHING DATA FOR A TEXTURE CACHE

(75) Inventors: Alexander L. Minkin, Los Altos, CA (US); Oren Rubinstein, Sunnyvale, CA (US)

(73) Assignee: Nvidia Corporation, Santa Clara, CA (US)

(*) Notice: Subject to any disclaimer, the term of this patent is extended or adjusted under 35 U.S.C. 154(b) by 62 days.

(21) Appl. No.: 09/712,383

(22) Filed: Nov. 13, 2000

(51) Int. Cl.[7] .................... G06F 12/08; G06T 11/40
(52) U.S. Cl. .................... 711/3; 711/118; 711/137; 711/202; 711/216; 345/552; 345/557; 345/568; 345/582
(58) Field of Search ................ 711/118, 128, 711/129, 127, 131, 144, 137, 157, 3, 216, 202; 345/582, 552, 557, 568

(56) References Cited

U.S. PATENT DOCUMENTS 6,353,438 B1 * 3/2002 Van Hook et al. .......... 345/552
6,389,504 B1 * 5/2002 Tucker et al. ............... 711/100

* cited by examiner

Primary Examiner—Reginald G. Bragdon
Assistant Examiner—Jasmine Song
(74) Attorney, Agent, or Firm—Townsend and Townsend and Crew LLP; J. Matthew Zigmant

(57) ABSTRACT

A cache memory apparatus for graphics and other systems. The cache memory apparatus includes a cache memory having a first number of cache lines, each cache line addressable by a cache line address; a first plurality of storage elements coupled to a first address bus; and a second plurality of storage elements coupled to the first plurality of storage elements. The first plurality of storage elements holds a second number of cache line addresses, and the second plurality of storage elements holds a third number of cache line addresses.

31 Claims, 12 Drawing Sheets

CIRCUIT AND METHOD FOR PREFETCHING DATA FOR A TEXTURE CACHE

CROSS-REFERENCES TO RELATED APPLICATIONS

This application is related to, and incorporates by reference in its entirety, commonly-assigned U.S. patent application No. 09/712,632, titled "Circuit and Method for Addressing a Texture Cache", filed Nov. 13, 2000.

BACKGROUND OF THE INVENTION

The present invention relates in general to graphics systems, and in particular to methods and apparatus for prefetching cache lines in a graphics system.

The sophistication of the market for computer and video graphics and games has exploded over the last few years. The time when simple games such as "Pong" was a marketable product is far in the past. Today's garners and computer users expect realistic three dimensional (3-D) images, whether the images are of a football game, race track, or new home's interior. Accordingly, this appetite has focused designers' efforts to improving the quality of the images produced by graphics systems in computers and video games.

Increasing the realism of video requires a higher screen resolution as well as displaying items as 3-D contoured objects, rather than simple two dimensional (2-D) pictures. These 3-D objects can be separated into 3-D shapes covered by a 2-D or 3-D texture.

A monitor's maximum resolution is set by the number of pixels on its screen. In color monitors, each pixel is made up of a red, green and blue "dot" in close proximity to one another. By varying the intensity of the "dots", the color and brightness of the pixel can be changed. The more pixels on a screen, the more realistic an image will appear. For example, if a typical tire on a race car is represented on the screen by one pixel, that pixel will be black. A single black spec on a screen would not make for a very impressive tire. But if the tire is represented by many pixels, then details such as shape, hub caps, lug nuts can be seen, and the image is more convincing. To add more realism, a texture, for example tire tread, can be added. Where the rubber meets the road, an asphalt texture may be used.

These textures are stored in memory, and are retrieved as required by the graphics system. They may be two dimensional or three dimensional. Two dimensional textures are two dimensional images, and the dimensional coordinates are typically labeled either s and t, or u and v. In systems using a conventional bilinear filter, four pieces of texture information, referred to as texels, are used to determine the texel value, which is the texture information for one pixel. 16 bits is a common size for each texel. Alternately, texels may be 4, 8, 32, or any other integral number of bits in size. Three dimensional textures are sets of two dimensional textures, and the coordinates are usually labeled s, t, and r. Trilinear filtering is common in systems supporting three dimensional textures, and uses 8 texels to determine the texture information for one pixel.

But this means that a huge amount of information is needed to supply the textures for a video image. For example, a conventional monitor screen having a of 1280 1024 pixel resolution with a 75 Hz refresh rate requires about 100M pixels per second. Since four 16 bit texels are used for each pixel, such a system operates at 6,400M bits per second, or 800M bytes per second.

This texel information is stored in memory for fast access by the graphics controller. Preferably it would all be stored in memory on the same chip as the other graphics system elements, using fast circuitry, such as static random access memory (SRAM). But SRAMs are large, and have high operating currents, so the die area and power costs are prohibitive.

A conventional solution to the problem of making a fast but cost effective memory is to use an architecture type known as a memory hierarchy. The concept behind memory hierarchy is to use a smaller amount of SRAM, preferably on-chip, and have a larger memory off-chip using less expensive circuitry, such as dynamic random access memory (DRAM). This way, some data needed quickly by the graphics controller is readily available in the on-chip fast SRAM, while the bulk of the data waits in the DRAM. If the controller needs data that is not available in the SRAM, it can pull the data from the DRAM and overwrite existing data in the SRAM. In this system, the SRAM is known as the cache, and the DRAM is the main memory. Memory hierarchy systems using cache may be used for storing texels in graphics systems.

FIG. 1 is a block diagram illustrating one such conventional system. Central processing unit (CPU) 100 can access data directly from cache memory 110. If the required data is not present, a copy is moved from the main memory 120, to the cache memory 110. Extra capacity and storage when the system is powered down is provided by an input output device such as a disk 130. Each element in the memory hierarchy from left to right has a slower access time, but has a lower per bit storage cost. In this way a system may be optimized for both access time and cost.

The CPU 100 uses the data in the cache memory 110 by making requests for data to cache 110 and reading data from the same. If the CPU 100 requests data not present in cache 110, a cache miss is said to have occurred. In this case, the cache will retrieve data from the main memory 120, store it, and provide it to the CPU 100. Similarly, if the main memory 120 does not contain the required data, the main memory 120 will retrieve data from the disk 130. If CPU 100 requests data which is present in cache 110, a cache hit is said to have occurred, and the data does not need to be retrieved from the main memory 120.

Data may be found in the main memory and stored in cache according to its frame address. A frame address may be divided into three portions, the tag, index, and offset. Generally, the tag is the higher order bits of the frame address, the offset is the lower, and the index is between them. The index determines the location of a data block in cache; the location is referred to as a cache line. The offset identifies the location of a texel in a cache line. The tag is specifies which data block in memory provided the data in the cache line. The tag is generally stored in a table, such that the tag for the data block stored in each cache line may be read.

A required texel's address is used in finding that texel in cache. The index is used to identify which cache line may be holding the required texel. The tags of these cache lines are compared against the tag of the required texel. If there is a match, the required texel can be found in the matching cache line at the offset. If there is no match, the data block with the matching tag is retrieved from memory and placed in cache.

There are two methods by which data blocks in the DRAM are written into cache. These are referred to as direct and associative. In direct mapped the index determines the location in cache where a data block may be placed. Each data block in the main memory has one cache line where it may be placed. That is, each cache line is uniquely identified by the index portion of the frame address. The tag identifies the frame address of the data block stored in a cache line. The direct method has the benefit of the simplicity because once a block's main memory address is known, the location where it may be placed in cache is also known.

The associative method comes in two varieties. In the fully associative method, a data block from memory can be placed in any cache line. In a fully associative cache there is no index signal. This has the advantage of being very flexible, but requires complex circuitry to locate each data block. For example, when attempting to access a texel in cache, the tag for that texel is compared against the tags for every cache line in the cache. In the direct method, since a texel can be placed in only one cache line, only one tag is compared.

A compromise between the direct and fully associative methods is n-way associativity. For example, in 2-way associativity, a data block data may be written into one of two locations in cache. In n-way associativity, there is the advantage that a block in the main memory may be written into more than one location in cache. Furthermore, not all cache line tags need to be compared when looking for a texel, rather n tags are checked.

An inherent drawback to this memory hierarchy scheme becomes apparent when it is contemplated for use in a graphics system as described above. In the CPU requests data from the cache, and a cache miss occurs, the cache requests and receives data from the main memory for presentation to the CPU. Unfortunately, the main memory is much slower than the cache memory and the CPU, thus every cache miss leaves the CPU idle for many CPU clock cycles. This is referred to as cache latency.

But in graphics systems, such as those consistent with embodiments of the present invention, texels are required at the tremendous speeds calculated above. The CPU cannot wait for the cache to retrieve data. This would result in "jumpy" or jittery graphic images being displayed. Rather, another solution which eliminates this cache miss latency must be found.

SUMMARY OF THE INVENTION

The present invention provides methods and circuitry for addressing the cache miss latency problem by using, in one exemplary embodiment, a first-in first-out (FIFO) apparatus to decouple the cache addressing circuits from the cache itself. The index and offset portions of the addresses are input to the FIFO. The FIFO holds the index and offset for a period of time dependent on the number of entries present in the FIFO. If a fetch from the main memory is required, the fetch can occur as the index and offset progress through the FIFO. A condition under which identical index signals associated with different tags are in the FIFO at the same time. To avoid a potentially improper overwriting of needed data when the overlapping index condition occurs, the present invention uses extra cache lines. The extra cache lines are not addressable by the index signals. Rather, according to a specific embodiment, one level of indirection is used. That is, index signals are translated by a read table to one of a number of cache line addresses. This number of cache line addresses is less than the total number of cache lines in the cache. The extra cache lines are addressable by a write table that directs the transfer of data from the main memory to the cache. When transferred data is needed, the appropriate cache line address in the read table is swapped for the appropriate cache line address in the write table, and the updated read table is used.

Accordingly, in one embodiment, the present invention provides a cache memory apparatus including a cache memory having a first number of cache lines, each cache line addressable by a cache line address; a first plurality of storage elements coupled to a first address bus; and a second plurality of storage elements coupled to the first plurality of storage elements. The first plurality of storage elements holds a second number of cache line addresses, and the second plurality of storage elements holds a third number of cache line addresses.

In another embodiment, the present invention provides a method of reading data from a cache line. The method comprises providing an address comprising an index; providing a fetch status, capable of having a value; and translating the index to a first cache line address. If the fetch status has a first value, data is read from a cache line identified by the first cache line address, otherwise the first cache line address is replaced with a second cache line address, and data is read from a cache line identified by the second cache line address.

In yet another embodiment, the present invention provides a cache system including a read queue, capable of queuing a plurality of index signals; a cache having a third number of cache lines; a first table comprising a first number of storage elements, wherein each storage element contains a cache line address; and a second table comprising a second number of storage elements, wherein each storage element contains a cache line address. The system also has a synchronizer, coupled between the first table and the second table; a read handler, coupled between the first table and the cache; and a write handler, coupled between the synchronizer and the cache.

A better understanding of the nature and advantages of the present invention may be gained with reference to the following detailed description and the accompanying drawings.

DETAILED DESCRIPTION

The Graphics Subsystem

Figure 1:
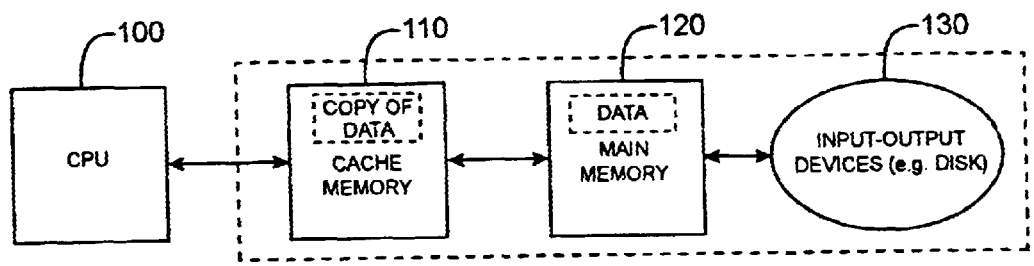
FIG. 1 is a block diagram showing a conventional memory hierarchy architecture.
Figure 2:
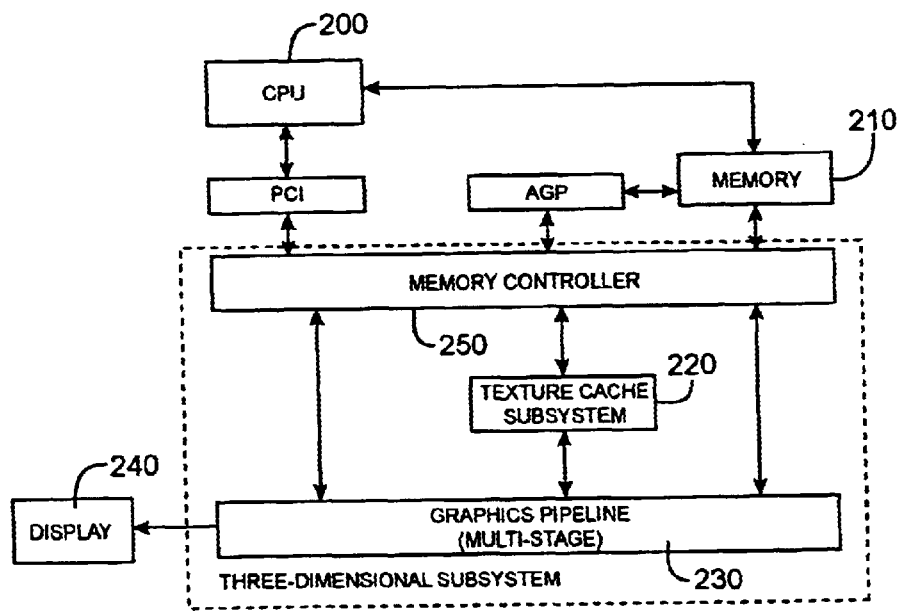
FIG. 2 is a block diagram illustrating a graphics system including a texture cache subsystem.

FIG. 2 illustrates one embodiment of a graphics subsystem consistent with the present invention. The graphics subsystem includes a graphics pipeline 230, a display 240, a central processing unit (CPU) 200, a main memory 210, a memory controller 250, and a texture cache subsystem 220 connected together by various buses as shown. The main memory 210 has a number of storage elements, each holding a two dimensional texture image. Graphics pipeline 230 uses the textures in memory 210 to display surface detail such as texture and shading on objects in the image on display 240. Specifically, graphics pipeline 230 receives graphics primitives and other data from the CPU via memory controller 250. The data used by the graphics pipeline 230 includes the triangle vertices, each vertex being specified by x, y, and z coordinates, R, G, B color data, and s and t (or s, t, and r) texture coordinates. During this data processing, graphics pipeline 230 provides texel addresses to, and receives texels from, the texture cache subsystem 220. The graphics pipeline performs various functions including geometry processing, fragment generation, hidden surface removal, and frame buffer display.

Cache Miss Latency

As discussed above, inefficiencies arise in this architecture because the texels required by the CPU 200 are not always available in the texture cache subsystem 220, and must be fetched from the main memory 210. This is a comparatively slow process, taking many clock cycles to complete. Since a steady steam of texel quads is required by the graphics pipeline 230, it is necessary that fetching from main memory 210 happens in such a way that the image rendering on display 240 is not stalled. This wait time caused by a cache miss is referred to as cache miss latency.

Figure 3:
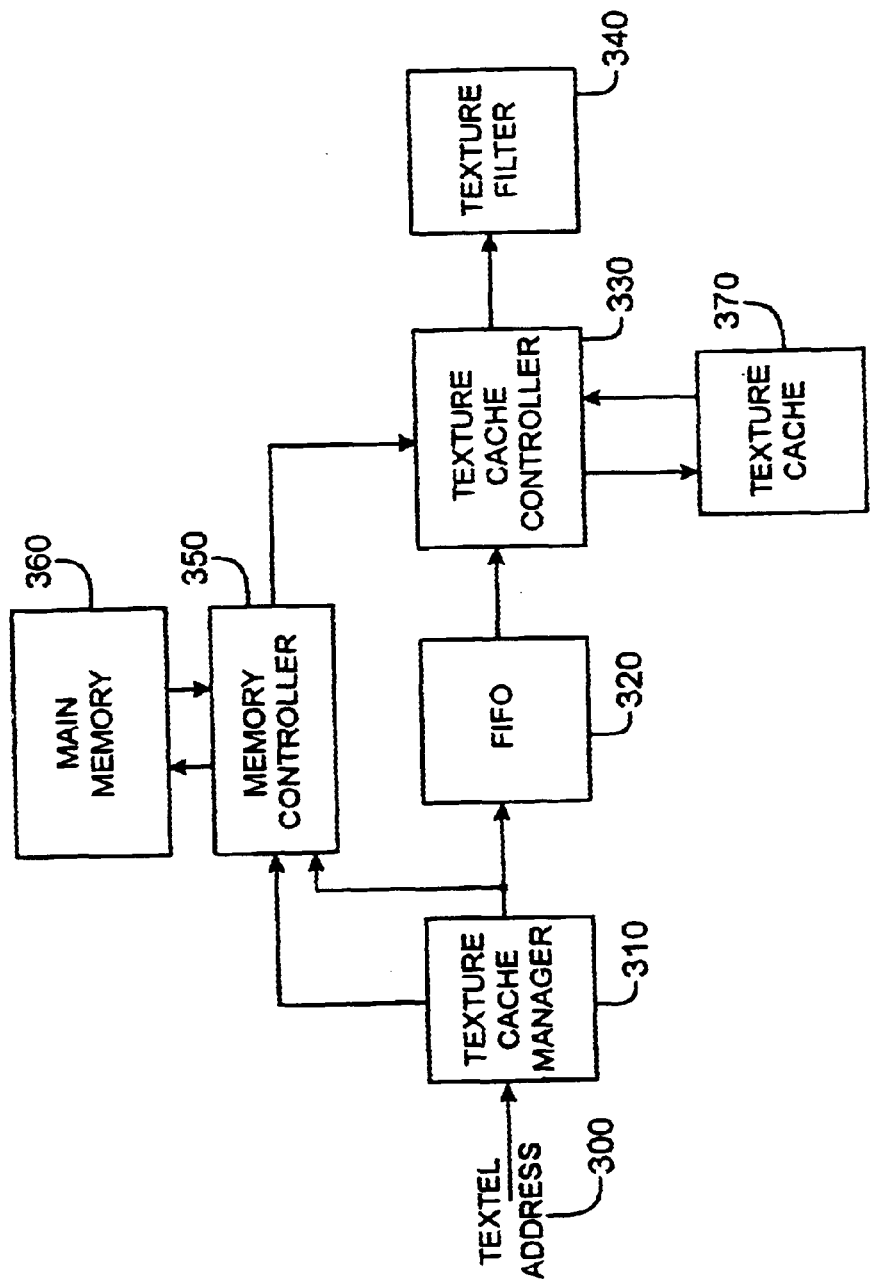
FIG. 3 is a block diagram representing a texture cache subsystem portion consistent with an embodiment of the present invention.

FIG. 3 illustrates an exemplary apparatus using a read queue that solves this cache miss latency problem for a texture subsystem designed in accordance with the present invention. This apparatus includes a texture cache manager 310, a read queue or FIFO 320, texture cache controller 330, texture filter 340, memory controller 350, main memory 360, and texture cache 370. Address information, referred to as simply an address, is provided to the texture cache manager 310 on line 300. This information may include index, offset and tag signals. These may include portions of texture memory addresses, and texel coordinate values. Additionally, other related information, such as texture id, or level of detail, may be included. Examples and more details may be found in U.S. patent application No. 09/712,632, titled "Circuit and Method for Addressing a Texture Cache", filed Nov. 13, 2000. Alternately, the address information may contain any other identifying information.

The texture cache manager 310 compares an incoming texel's tag against the appropriate tags of data blocks in texture cache 370, and determines whether required texels are available in the texture cache 370. If not, the texture cache manager 310 sends requests to the memory controller 350 for the needed texels. The cache addresses output by the texture cache manager 310 are sent both to the FIFO 320 and memory controller 350. Alternately, the texel address on bus 300 may be sent to memory controller 350. The FIFO 320 typically stores the index and offset portions of the texel address, along with a fetch flag or request, which indicates the address requires a cache line update.

The memory controller 350 sends requests for data to the main memory 360, as instructed by the texture cache manager 310. The memory controller 350 provides required texels which are not in cache to the texture cache controller 330 for placement in the texture cache 370. The texture cache controller 330 receives addresses from the FIFO 320, data from the memory controller 350, and provides data, specifically texels, for the texture filter 340. The texture cache controller 330 retrieves data from texture cache 370 specified by addresses from FIFO 320, and stores data received from the memory controller 350 in the texture cache 370. The location where this data is stored is discussed below. The texture cache controller 330 supplies the texels from the texture cache 370 to the texture filter 340.

The read queue may be implemented as a FIFO, a memory, a plurality of registers, or any other appropriate circuitry. In this and the following figures, the read queue is referred to as a FIFO, but any of the above listed circuits could be used. FIFO 320 is many addresses deep, for example it maybe 512 addresses deep. Alternately, the FIFO may have a depth of 128, 216, 1024, or any other integer number. Addresses are delayed in the FIFO for the amount of time required for it to reach the FIFO output. The more addresses present in the FIFO when an address is input, the longer that address takes to reach the FIFO output. The delay through the FIFO gives the memory controller time to fetch the required texel, and have it available in the texture cache 370 when it is required by the texture cache controller 330 for delivery to the texture filter 340. This FIFO delay is what allows a miss in the texture cache 370 to occur without slowing the pixel data processing for the on-screen image. If the FIFO delay is shorter than the time required for the cache line update to occur, the downstream processing—that is the processing dependent on outputs from the FIFO—stalls until the update is complete. Similarly, if the FIFO has no addresses to output, the downstream processing is stalled. Decoupling the texture cache controller 330 from the texture cache manager 310 by using the FIFO 320 solves the cache miss latency problem.

Overlapping Index Signals

A potential problem with the above solution to the cache miss latency is one of overlapping index signals. It can be seen by considering the following scenario. In this example, a 1-way associative cache is used, but the concept holds for an n-way associative cache. A first address having a tag x and index y is provided at the input of the FIFO 320 by texture cache manager 310. The tag x matches the tag of the data in the cache line identified by the index y. Therefore, there is no fetch request made to the memory controller 350, and the index y—along with the offset—enters the FIFO 320. After the texture cache manager generates a number of addresses, where the number of addresses is less than the FIFO depth, a second address having a tag b and index y is provided to FIFO 320. Since it is known from above that the cache line identified by index y has the tag x, there is a cache miss, and the data block having the tag b is requested from the main memory 360.

The data having a tag x and index y is needed by the system once the first index y reaches the output of the FIFO 320. Therefore, the data block having tag b and index y cannot be written into the cache line identified by index y. If it is, the wrong texel will be retrieved from the texture cache 370 when the first index y reaches the output of the FIFO 320. Therefore, it is necessary to provide a solution to this overlapping index problem, to keep a cache line update from corrupting data required by an address entry in the FIFO.

Again, the above example used a 1-way associative cache. A two-way, or a four-way, or an n-way, where n is any positive non-zero integer, can alternately be used. In an n-way cache, each index signal identifies n cache lines, referred to as a cache line set. In the case of a cache miss, the cache line in the cache line set which was the least recently used (LRU) is chosen for updating. For example, in a 2-way cache, where there is a first cache line and a second cache line, one bit may be used to indicate which was least recently used. In a 4-way cache, a binary word of two or more bits may be used to indicate which of the four cache lines was least recently used. Alternately, a fully associative cache may be used.

Figure 4:
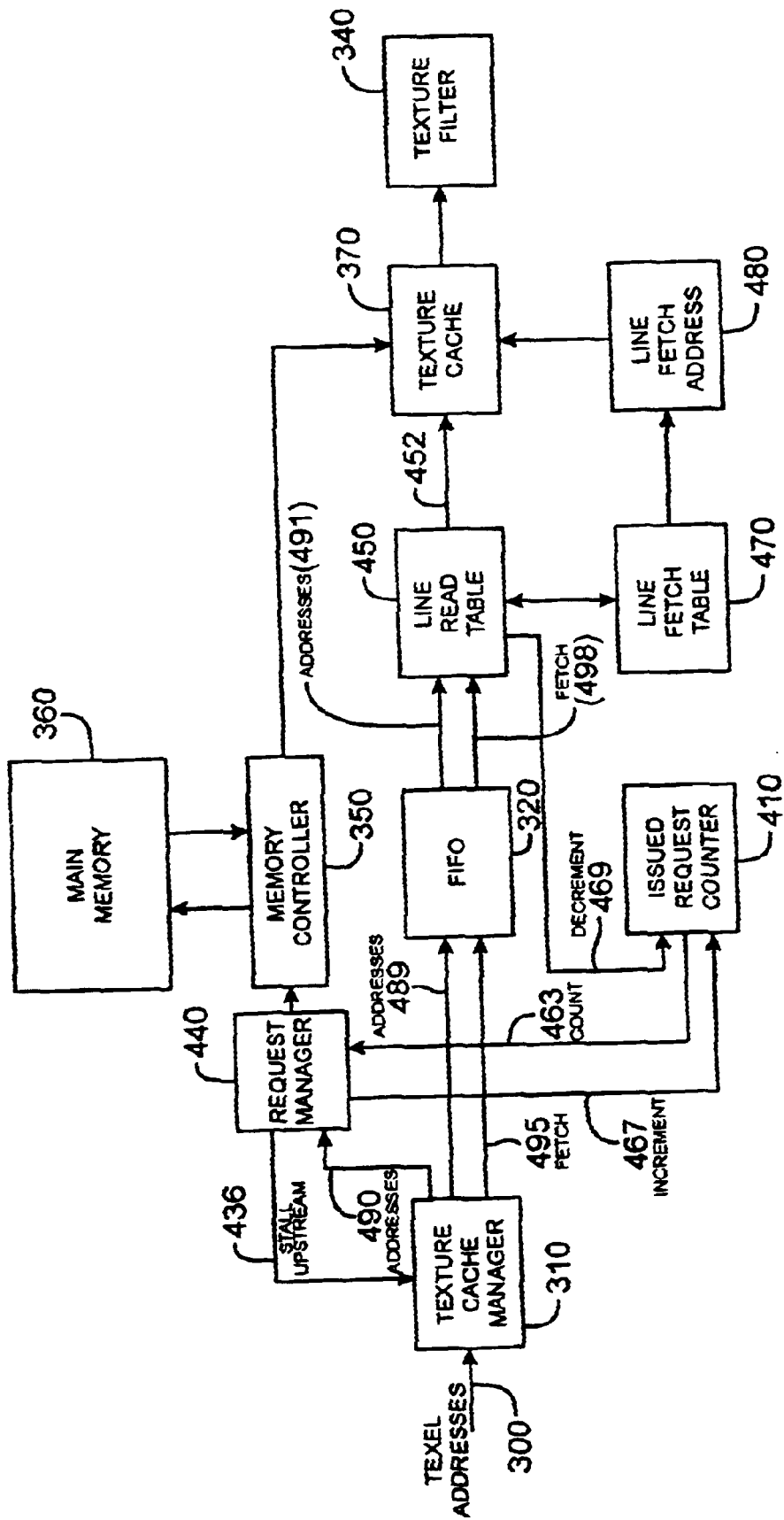
FIG. 4 is a more detailed texture cache subsystem block diagram consistent with an embodiment of the present invention.

FIG. 4 is a block diagram representing the circuitry used by one embodiment of the present invention. The circuit uses extra cache lines and one level of indirection to at least mitigate the overlapping index problem. Texture cache controller 330 details are shown, namely line read table 450, line fetch table 470, and line fetch address 480. Also included are an issued request counter 410, request manager 440, as well as the texture cache manager 310, memory controller 350, main memory 360, FIFO 320, texture cache 370, and texture filter 340.

The overlapping index problem is mitigated by using a texture cache 370 with extra cache lines. Most of the cache lines in texture cache 370 are accessed by cache line addresses stored in the line read table 450. Also, a number of extra cache lines are provided, and these cache lines are accessed by cache line addresses stored in the line fetch table 470. As cache lines are written to the texture cache 370, they are written to a cache line identified by an address in the line fetch table 470. In one embodiment, the number of cache line addresses in the line read table 450 is the same as the number of possible index signals. But this would mean that an index signal could not access the cache lines addressable by the line fetch table 470. To solve this, one level of indirection is used, where index signals are translated to cache line addresses, and entries are traded between the line fetch table 470 and line read table 450. A more detailed explanation follows.

A cache address generator in a texture address block breaks the address into its constituent portions, namely the tag, index, and offset, and provides it to the texture cache manager 310 on texel address bus 300. The texture cache manager 310 compares this tag against all the appropriate tags associated with data stored in texture cache 370, in order to determine whether the required cache line is available or must be retrieved from the main memory 360. In the case of a cache miss—there is no match between the tag portion of the address on texel address bus 300 and the tags stored in cache—the texture cache manager 310 provides the needed cache line address on address line 490 to request manager 440. Texture cache manager 310 also provides the address to the FIFO 320 using line 489, and a fetch request on fetch line 495. The address on address line 490 and fetch request on fetch request line 495 are stored by the FIFO 320. Specifically, only the index and offset are stored by the FIFO 320 in one embodiment of the present invention. An active fetch request indicate that a cache miss occurred, and that required cache line or lines have been requested. In one embodiment, the fetch request may indicate that 1, 2, 3, or 4 cache lines have been requested. In other embodiments, other number of cache line requests, such as one to eight, may be indicated. FIFO 320 provides address information on address bus 491, and the fetch request on line 496. The index portion of the address on address bus 491 is input to the line read table 450.

In one implementation of the present invention, the line read table 450 is a look-up table which translates the index into a cache line address or location in texture cache 370. That is, each possible index signals corresponds to a unique entry in the table, and each entry in the table is a different cache line address. If the fetch request on fetch line 496 indicates a cache hit, the index signal portion of the address on address bus 491 is translated to a cache line address in texture cache 370; the cache line address in the table entry identified by the index signal is output to the texture cache on line 452. The texture cache 370 receives the cache line address, as well as the offset, and provides the required texel or texels to texture filter 340. In one embodiment, for each cache line address and offset, four texels are provided to the texture filter 340. But if the fetch request on fetch line 496 indicates a cache miss, the line read table 450 must be updated using information from the line fetch table 470.

The line fetch table 470 is a look-up table which stores cache line addresses and corresponding validity bits that indicate whether the identified cache line contains valid data. The look-up table may be a FIFO, SRAM, DRAM, or other memory type. The cache line addresses are stored in the line fetch table 470 in order. The first cache line address which has a corresponding inactive validity bit is the line fetch address 480. When a cache line update occurs, the data is written into the cache line identified by the line fetch address 480, the validity bit of that entry is made active, and the next entry becomes the line fetch address 480.

When the line read table 450 is updated, the line read table 450 sends the cache line address associated with the index portion of the address to the bottom of the line fetch table, and enter the address in the top entry of the line fetch table moves to the vacated entry in the line read table 450. In this way, the updated entry in the line read table 450 correctly points to the updated cache line in texture cache 370, and the cache line may be read.

As before, cache line updates are done by the memory controller 350. If the texture cache manager 310 determines that a cache miss has occurred, the fetch request on line 495 is active, and the block containing the required texel is requested from the main memory 360. The memory controller 350 receives the required cache line's address and requests the data from the main memory 360. Memory controller 350 receives the data block and sends it to texture cache 370.

The conditions from the above scenario, which detailed the overlapping index problem, may now be applied to the circuit of FIG. 4. Again, a first address having a tag x and index y is provided at the input of the FIFO 320 by texture cache manager 310. The tag x matches the tag of the data in a first cache line identified by the index y. Therefore, there is no fetch request made to the memory controller 350, and the index y—along with a first offset, and an inactive fetch request—enters the FIFO 320. After the texture cache manager generates a number of addresses, a second address having a tag b and index y is provided to FIFO 320. Since it is known from above that the first cache line identified by index y has the tag x, there is a cache miss, and the data block having the tag b is requested from the main memory 360. The index y, a second offset, and an active fetch bit enter the FIFO. The needed data is then stored in the texture cache 370 at a second cache line identified by the line fetch address 480.

A texel having a tag x and index y is needed by the system once the first index y reaches the output of the FIFO 320. The index y is translated to a cache line by the line read table 450, and the required texel is found in that cache line at the first offset. When the second index y reaches the output of the FIFO 320, the active fetch bit triggers a swap between the line read table 450 and line fetch table 470, such that the second cache line's address is associated with the index y in the line read table 450. The address associated with the first cache line is moved to the bottom of line fetch table 470, and the first cache line becomes available for future write operations. Index y is translated to the address of the second cache line, and the required texel is found in the second cache line at the second offset.

Using a line read table for read operations, and a second line fetch table for write operations, decouples read and write operations such that the overlapping index problem is at least mitigated. But there will be a finite number of entries in the line fetch table, so the line fetch table may become full, that is each entry may have an active validity bit. Increasing the number of entries may be desirable, but each entry requires an associated cache line. Therefore, optimal system design requires consideration of the frequency and type of cache misses, as well as other factors, in a given implementation.

Specifically, one such implementation uses a cache memory which comprises 68 cache lines. The index portion of the addresses on address bus 491 is made up of 5 bits for 32 distinct index addresses. Sixty four of the 68 cache lines are arranged in 32 sets, each having two cache lines, each addressable by an entry corresponding to the index value in the line read table 450. The other four cache lines are accessible for write updates by entries corresponding to addresses in the line fetch table 470. The issued request counter 410 indicates the number of cache lines that are currently unavailable for write operations. In one implementation, issued request counter 410 indicates the number of unavailable cache lines by identifying the number of cache lines that have been fetched and are awaiting a line read table update. In alternate embodiments, the cache may be a 1-way, or n-way associative cache, where n is any integral number. The cache may instead be a fully associative cache. The number of cache line, and table entries may also vary. In various embodiments of the present invention, the offset may be passed unchanged from the FIFO to the texture cache. In other implementations, the offset may be altered, or translated in some manner. For example, a look-up or translation table may be used to change the offset into a second offset signal. Specific values are provided in the document in order to make explanations more understandable, and do not limit the appended claims.

Excessive Fetch Requests

If all the entries in the line fetch table have active validity bits, there is no location in the texture cache 370 for a cache line update to be written. To avoid overwriting needed data, the cache line updating is stalled. This is done by the issued request counter 410 and request manager 440. These blocks may be considered as one; they are broken out here to aid in explanation. The issued request counter is incremented each time a cache line update is requested, and decremented each time a line read table update is done. In this way the issued request counter tracks the number of cache lines required for cache line updates needed by addresses in the FIFO 320. This number is output by the issued request counter on bus 463 to the request manager 440. The counter counts from zero to a maximum value, which is the number of entries in the line fetch table 470.

The request manager 440 ensures that a cache line update will not be performed by the memory controller 350 unless there is an available cache line in texture cache 370. If there is a cache miss, the texture cache manager 310 sends the address on line 490 to the request manager 440. The request manager checks the count provided on line 463. If the count is less than its maximum value, the request manager increments the issued request counter 410 by sending a signal on line 467, and passes the address to the memory controller, which then updates the cache line identified by the line fetch address 480. But if the count on bus 463 is at its maximum, the request manager does not send the address to the memory controller 350, rather it sends a stall signal on line 436 to the texture cache manager 310. The texture cache manager 310 then stalls the upstream processing. The downstream activity continues, and the FIFO 320 outputs addresses until there is a read table update, which decrements the issued request counter 410. This causes the count falls below its maximum, and the address is passed to the memory controller 310 by the request manager 440. The request manager 440 withdraws the instruction to stall, and the upstream processing begins.

Upstream Stalling

It is desirable to avoid or limit this upstream stalling. This may be done by increasing the number of entries in the line fetch table 470 and corresponding cache lines in texture cache 370. But this is expensive, and requires extra hardware to implement. A more efficient way to mitigate the frequency of upstream stalling is shown in FIG. 13.

Figure 13:
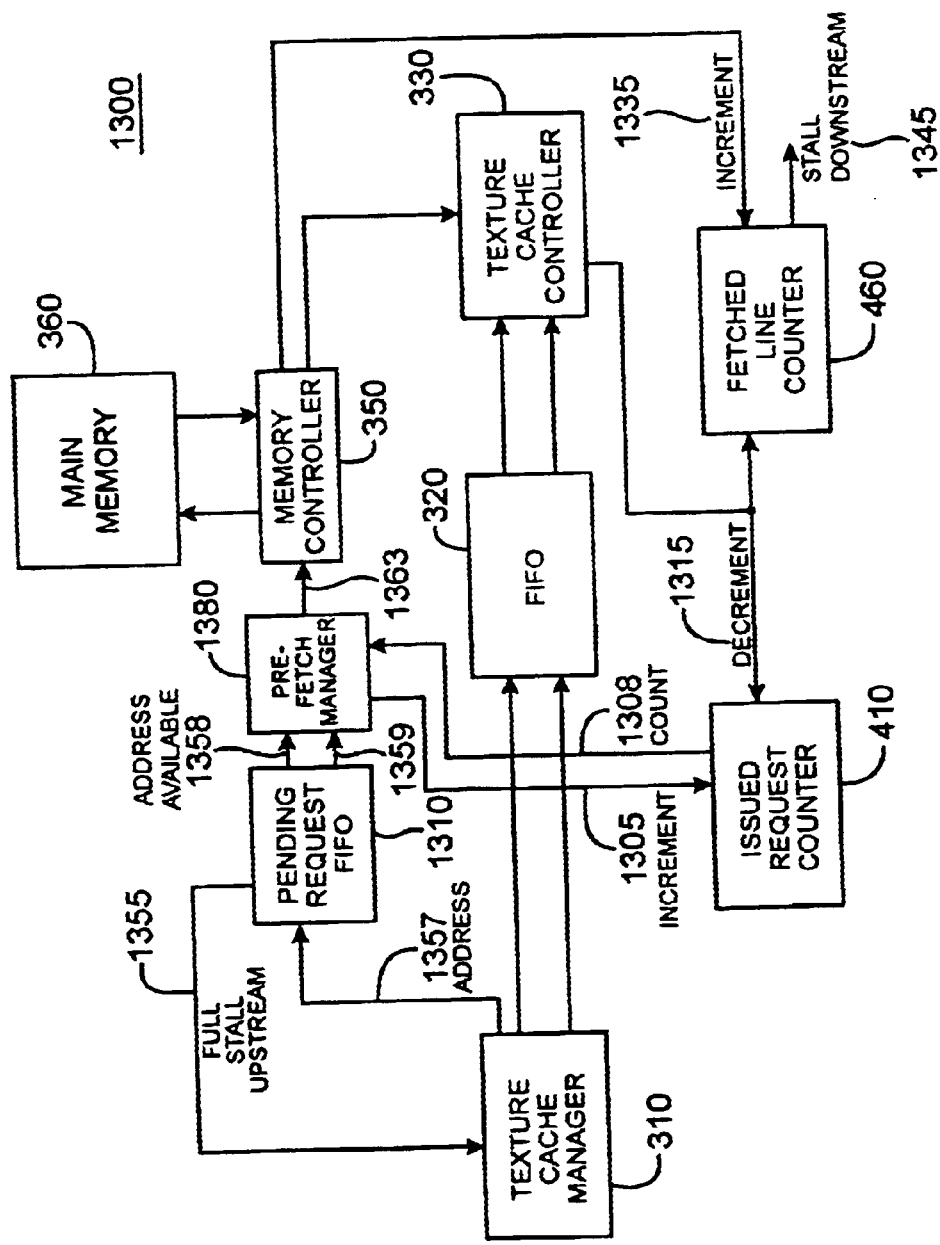
FIG. 13 is a block diagram focusing on the FIFO and surrounding circuitry as implemented in one embodiment of the present invention.

FIG. 13 is a block diagram 1300 focusing on the FIFO 320 and surrounding circuitry as implemented in one embodiment of the present invention. Included are texture cache manager 310, FIFO 320, texture cache controller 330, main memory 360, memory controller 350, pending request FIFO 1310, issued request counter 410, fetched line counter 460, and pre-fetch manager 1380. Some of these blocks are optional; for example, the pending request FIFO 1310 may be removed. As with all the figures, the specific blocks may be combined, moved, or renamed. For example, the issued request counter 410 may be included as part of the texture cache manager 310.

The frequency of upstream stalls is reduced in one embodiment of the present invention by including a pending request FIFO 1310. When the texture cache manager 310 determines that a cache miss has occurred, it provides the address on bus 1357 to the pending request FIFO 1310 for storage. If there are addresses stored in the pending request FIFO 1310, the pending request FIFO 1310 outputs an address available signal on line 1358. If the pending request FIFO 1310 is full, a full signal is output on line 1355. If the pending request FIFO does fill, no more addresses may be sent by the texture cache manager 310 on bus 1357. In this case, the full signal on line 1355 will instruct the texture cache manager 310 to stall the upstream processing. In this way, if all the validity bits in the line fetch table are active, one further cache miss does not stall the upstream processing, rather the pending request FIFO 1310 must fill. The addresses are kept in the pending request FIFO 1310 until they are output under the direction of the pre-fetch manager 1380.

Pre-fetch manager 1380 is similar to the request manager 440 above. Specifically, the pre-fetch manager 1380 periodically checks the count signal on bus 1308 from the issued request counter 410. For example, the pre-fetch manager 1380 may check every system clock cycle. Again, the count signal indicates the number of issued requests, as counted by the issued request counter 410. If the number of issued requests is less than the number of entries in the line fetch table, the pre-fetch manager 1380 polls the pending request FIFO 1310 for addresses by checking the status of the addresses available signal on line 1358. If there is an address in the pending request FIFO 1310, the pre-fetch manager 1380 passes the address on the output bus 1359 of the pending request FIFO 1310 to the memory controller 350 on bus 1363, and increments the issued request counter 410 by sending an increment signal on line 1305. If the pending request FIFO 1310 is empty, the pre-fetch manager 1380 has no address to pass, and the memory controller does not perform a cache line update. But if the number of issued requests is equal to the number of entries in the line fetch table, the pre-fetch manager 1380 will not pass an address to the memory controller 350, even if there are addresses in the pending request FIFO 1310.

In short, if the issued request counter 410 has a count value less than the number of entries in the line fetch table, the pre-fetch manager 1380 may pass addresses to the memory controller 350. If the number of issued requests is equal to the number of entries in the line fetch table, the pre-fetch manager 1380 waits for the count provided on bus 1308 to drop before passing an address to the memory controller 350. If the FIFO is full, the full flag on line 1355 from the FIFO is active, and the upstream processing is stalled. The downstream processing may continue, since the FIFO 320 can continue to provide addresses. But if the FIFO 320 ever does become empty, the downstream processing is also stalled.

Proper selection of the depth of the pending request FIFO 1310 may make it unlikely that it will fill. As addresses are processed by the texture cache manager 310, there will be some cache misses. The corresponding addresses are sent to the pending request FIFO 1310, and the pending request FIFO 1310 begins to fill. But at the same time, the texture cache controller 320 receives addresses from the FIFO 320, some of which require a read table update. Since each read table update frees up one cache line location, the pre-fetch manager 1380 passes an address from the pending request FIFO 1310 to the memory controller 350, and the pending request FIFO empties. A proper depth to the pending request FIFO 1310 can compensate for the elasticity between this filling and emptying, such that upstream process stalling is minimized. For example, in one implantation, the pending request FIFO 1310 has a depth of 16. In alternate embodiments, the pending request FIFO may be 8, 32, or any other number of addressed deep.

Downstream Stalling

But a large pending request FIFO 1310 makes it more likely for another problem to arise, for which the fetched line counter 460 is included in one embodiment of the present invention to solve. As addresses which required a cache line update are processed by the texture cache manager 310, they are output to the pending request FIFO 1310, and the FIFO 320. The deeper the pending request FIFO 1310, the longer it may—depending on the number of previous requests—take for the address to be output to the memory controller 350, and the less likely the cache line update will have taken place before the address is output from the FIFO 320. If that happens, the correct data is not available, and the downstream processing should be stalled until the cache line or lines are updated. This also happens on start-up. The FIFO is empty, and none of the cache lines have been updated, so no entries in the line fetch table have a valid entry. A line read table update cannot be done, and the downstream processing should be stalled until the cache line is updated.

The fetched line counter is included to stall the downstream processing if required cache line updating has not occurred. The fetched line counter 460 is incremented each time the memory controller updates a cache line. When an updated cache line address moves from the line fetch table to the line read table, the fetched line counter is decremented. The line fetch counter 460 therefore indicates the number of entries in the line fetch table with active validity bits. When an address having an active fetch request is output from the FIFO 320, the texture cache controller checks to see if the fetched line count is equal or larger than the number of read table entries which the fetch request indicates must be updated. If it is, the read table is updated, the line fetch table is updated, and processing continues. But if the fetched line count is less than the number of read table entries that the fetch request indicates must be updated, downstream processing is stalled, more cache lines are updated until processing may resume.

In some embodiments of the present invention, each fetch request stored with its corresponding address in the FIFO indicates whether 1, 2, 3 or 4 cache lines need to be updated. This is because a group of four texels, a texel quad, may be stored in 1,2, 3, or 4 cache lines. Details maybe found in U.S. patent application No. 09/712,632, titled "Circuit and Method for Addressing a Texture Cache", filed Nov. 13, 2000. In other embodiments, each fetch request may indicate that other numbers of cache lines are to be updated.

In short, if the fetched line counter 460 indicates that n cache lines have an active validity bit, and the fetch request indicates n+x cache line updates are required, the downstream activity is stalled, and the texture cache controller waits for x more cache line updates before restarting the downstream processing. The upstream processing is able to continue, since the texture cache manager 310 can continue to fill the pending request FIFO 1310 and FIFO 320. Again, if the FIFO 320 does fill completely, the upstream processing is stalled.

Figure 5:
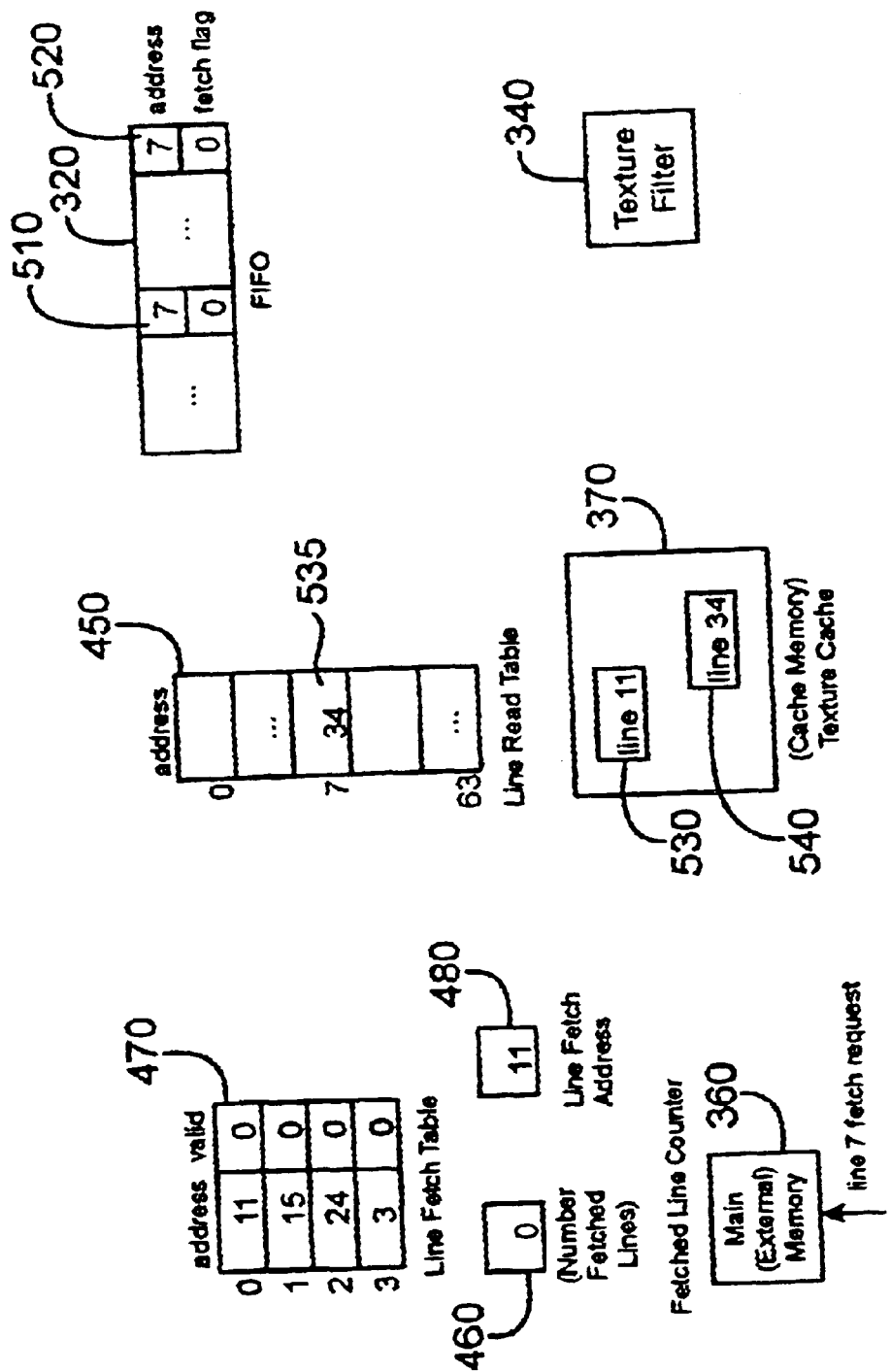
FIG. 5 is a texture cache controller and related circuitry conceptual block diagram consistent with an embodiment of the present invention.

FIG. 5 is a conceptual block diagram illustrating some circuitry shown in FIG. 4 consistent with one embodiment of the present invention. The block diagram includes a line fetch table 470, a line read table 450, a FIFO 320, a fetched line counter 460, a line fetch address 480, a main memory 360, texture cache 370, and texture filter 340. The line fetch table 470 has four locations, each including an address, and a valid bit indicating whether fetched data is residing in cache at that address. The fetched line counter is set at zero, and the line fetch address 480 holds the top entry of the line fetch table 470, which is 11. The line read table 450 has 64 locations, labeled 0 to 63. Each location corresponds to one of 64 index addresses uniquely identified by a six bit index signal, and each location has an entry which is an address in texture cache 370. Texture cache 370 has 68 cache lines; lines 11 (530) and 34 (540) are indicated. FIFO 320 shifts from right to left. Therefore, address 7 was requested as indicated by entry 510, and was a cache hit. Subsequently, address 7 was again requested, entry 520, but the tags did not match, a cache miss occurred, and a fetch was requested.

Figure 6:
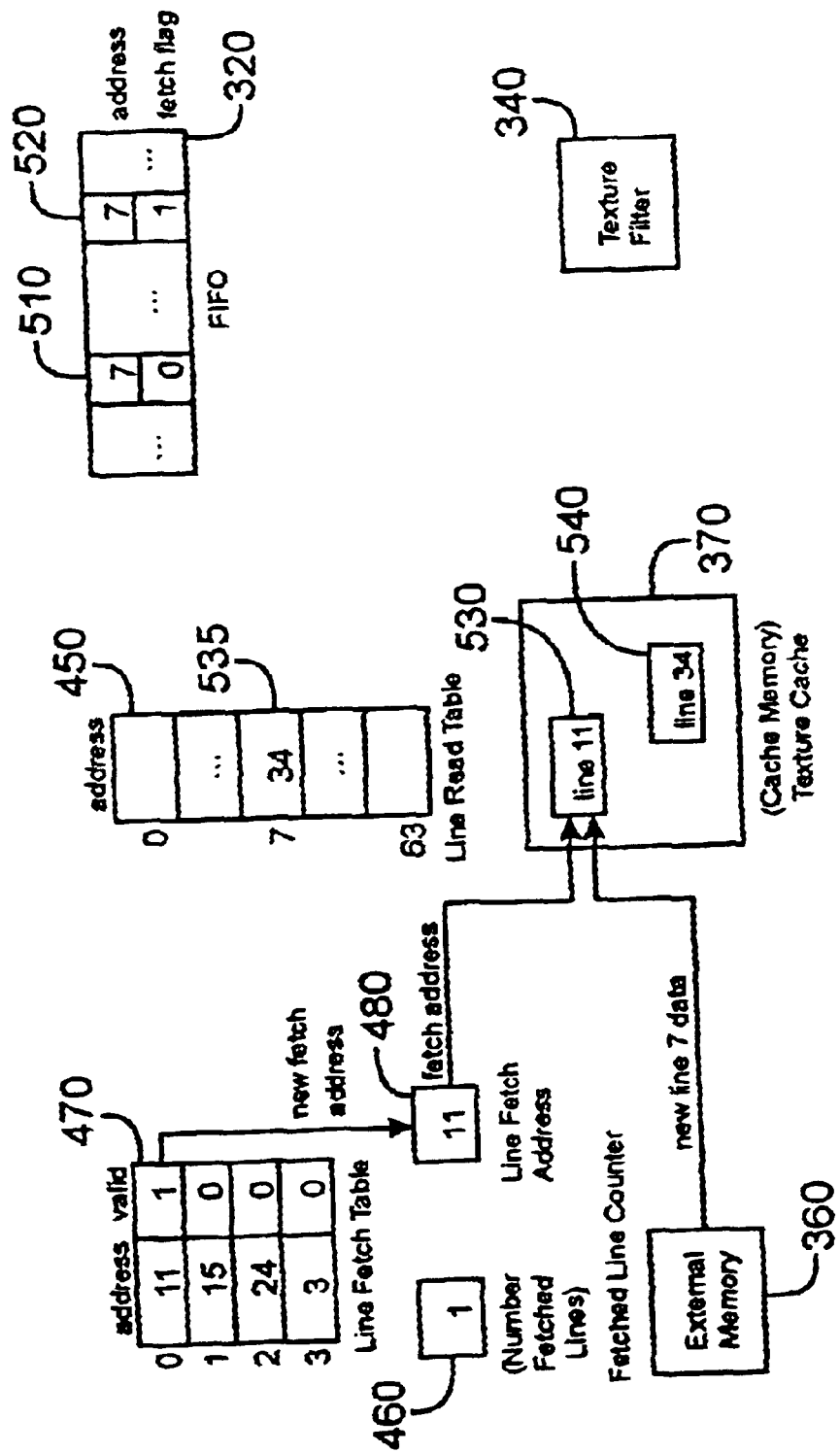
FIG. 6 is a conceptual block diagram representing a texture cache controller and related circuitry showing a cache line update from a main memory in a manner which is consistent with an embodiment of the present invention.

The fetch is processed by the memory controller 350, and in FIG. 6 the updated cache line for line 7 is entered at location 11 in texture cache 370 as indicated by the line fetch address 480. Meanwhile, FIFO entries 510 and 520 have shifted further to the left. At this point, two cache lines identified by the index signal 7 reside in cache; one is accessible by the line read table, the other is accessible by the line fetch table. The number of fetched lines 460 is incremented to 1.

Figure 7:
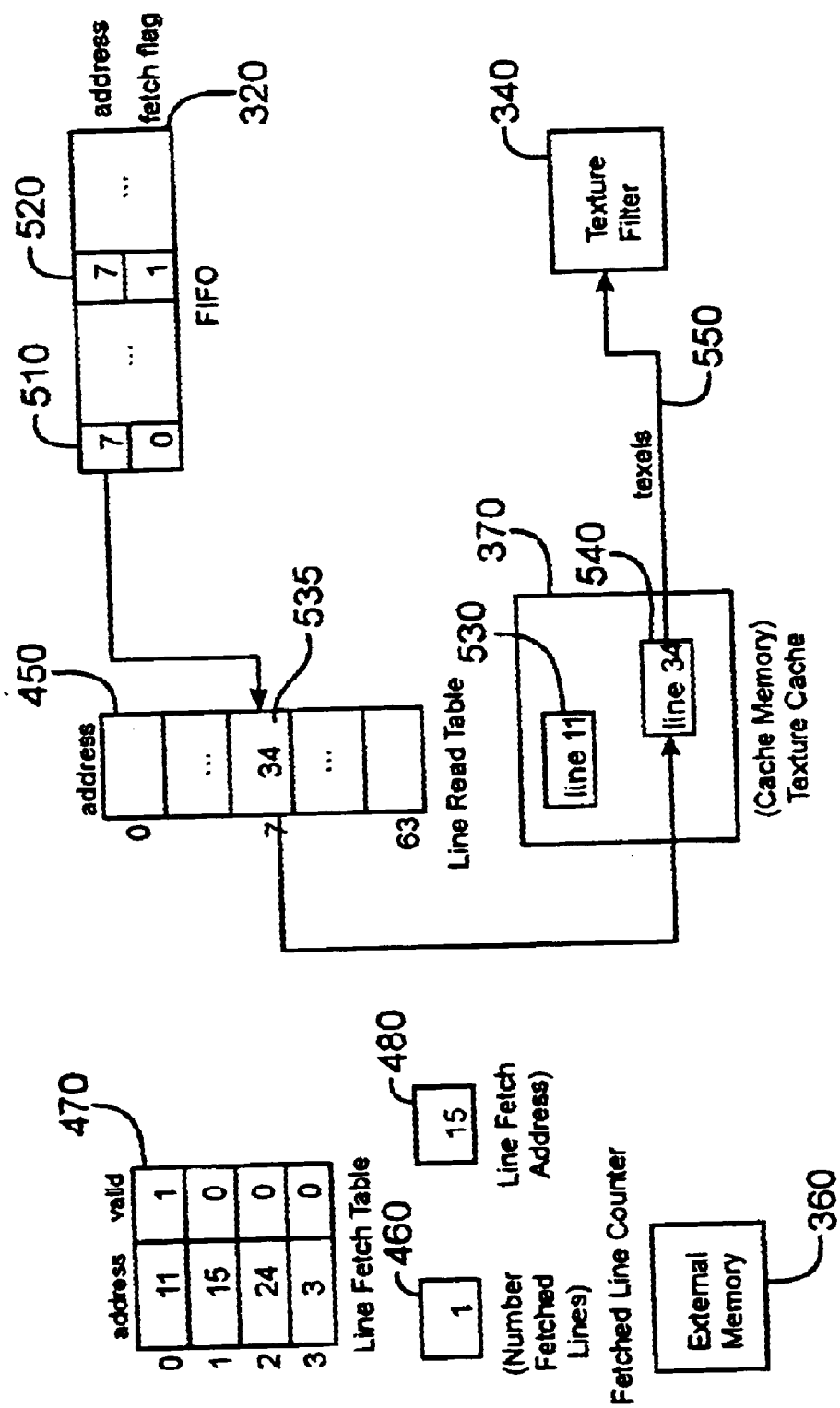
FIG. 7 is a conceptual block diagram illustrating a texture cache controller and related circuitry showing a cache line read consistent with an embodiment of the present invention.

FIFO entry 510 reaches the FIFO 320 output and enters the texture cache controller in FIG. 7. The address index is read as a 7, and line read table shows that texels with an index equal to 7 are stored in cache line 34. The offset portion of the address from the FIFO is checked, and the texel or texels in cache line 34 at the location indicated by the offset is output on line 550 to texture filter 340. As above, the offset may indicate 1, 2, 3, 4, or any other number of texels. For example, the cache may be designed to output four adjacent texels, where one of the texels is identified by the offset. It is also noted that the valid bit associated with updated cache line 11 in the line fetch table 470 is set. The line fetch address 480 indicates that the next fetched line is to be sent to cache line 15, which is the next available entry in the line fetch table 470.

Figure 8:
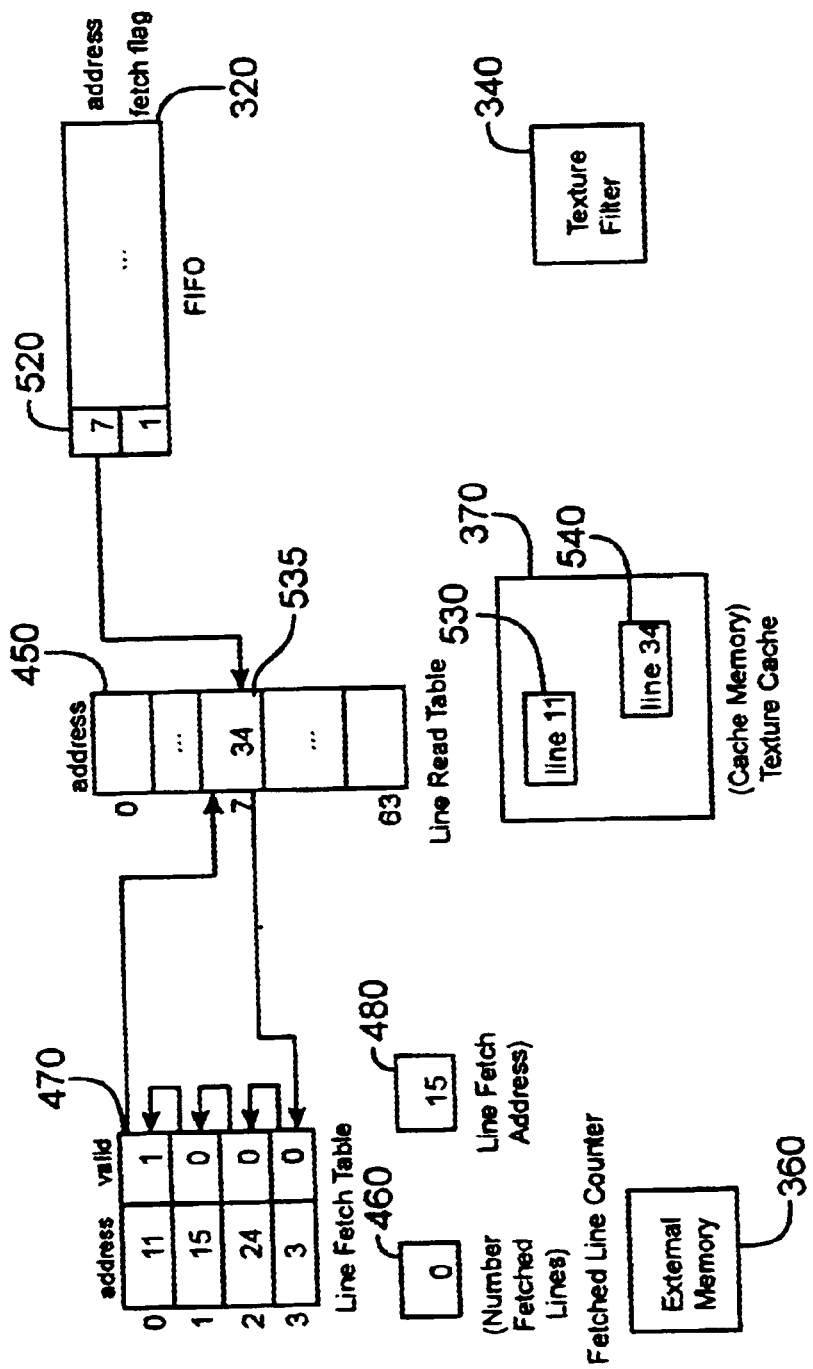
FIG. 8 is a texture cache controller and related circuitry conceptual block diagram showing a line read table update consistent with an embodiment of the present invention.

In FIG. 8, FIFO entry 520 is output. Again, the index is 7, indicating the cache line address 34 in texture cache 370. But this time an active fetch request or flag is associated with the address. Cache line address 34 moves from the line read table 450 to the bottom of the line fetch table 470. The top entry of the line fetch table 470, which is 11, moves to the line read table in the spot just vacated, and which corresponds to an index equal to 7. Each entry in the line fetch table 470 moves up one position, with address 15 taking the top spot, and remaining in the line fetch address location 480.

One embodiment of the present invention uses a validity bit associated with each cache line address in the line fetch table 470. The validity bit may be set when the external memory 360 updates a cache line identified by an the corresponding address in the line fetch table 470. When a read operation requires the address move from the line fetch table 470 to the line read table 450, the validity bit is checked. If the validity bit is set, the cache line has been updated, and the address may move. If the validity bit is not set, then the write operation from the main memory 360 has not been completed, and the system will wait for the cache line to be updated. One implementation of the present invention provides for fetch request which may indicate that 1, 2, 3, or 4 cache lines need updating. If four cache lines need updating, the system will wait for all the cache lines to be updated. At that time four entries in the line fetch table 470 will have a set or active validity bit, and the line read table 450 will be updated. In one embodiment of the present invention, the fetch flag or request may indicate whether 1, 2, 3, or 4 lines need to be updated. If 2 lines need to be updated, then two entries from the line fetch table are moved to the line read table, and two entries from the line read table are moved to the line fetch table, assuming the availability of valid data in two cache lines identified in the line fetch table. If there are less then two valid cache lines in the line fetch table, downstream processing is stalled until the memory controller updates a sufficient number of cache lines to restart processing. In alternate embodiments, other amounts of cache lines needed updates may be indicated by the fetch request or flag.

Figure 9:
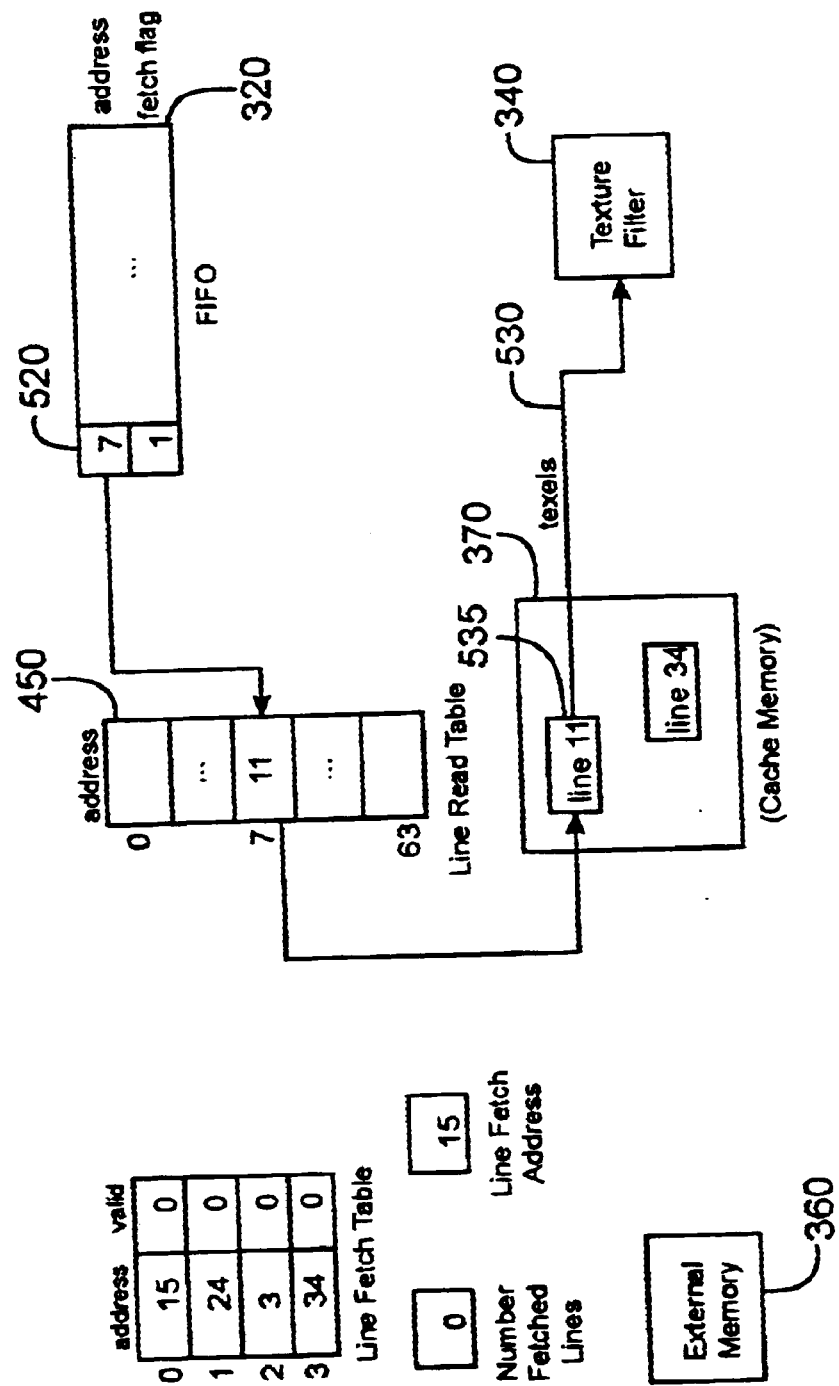
FIG. 9 is a conceptual block diagram showing a texture cache controller and related circuitry illustrating a cache line read using an updated line read table consistent with an embodiment of the present invention.

FIG. 9 shows that the index equal to 7 correctly corresponds in the line read table 450 to cache line 11 (535) in texture cache 370. The offset portion of the address in FIFO entry 520 is determined, and the texel in cache line 11 at that offset is output on bus 530 to texture filter 340.

The use of two cache line addresses in the figures above—one in the line read table 450, the other being the line fetch table 470—allows the cache circuit to use two different cache lines that are both identified by the same index signal. The first cache line, that identified by the line read table 450, continues holding a first data block. The second cache line, identified by the line fetch table 470 holds a second data block which was fetched from the main memory. With this approach, the cache circuit does not overwrite the first data block with the second data block before the first data block is needed. Even after storing the second data block in cache, the cache can supply the first data block until receipt of the read request which triggered the fetching of the second data block. At that time, the cache swaps the cache line entry in the line read table 450 with that in the line fetch table 470, and makes available the first cache line for cache line updates. This simultaneous use of two cache lines for one index signal eliminates the lost data problem caused by the second data block overwriting the first data block which would otherwise occur.

Figure 10:
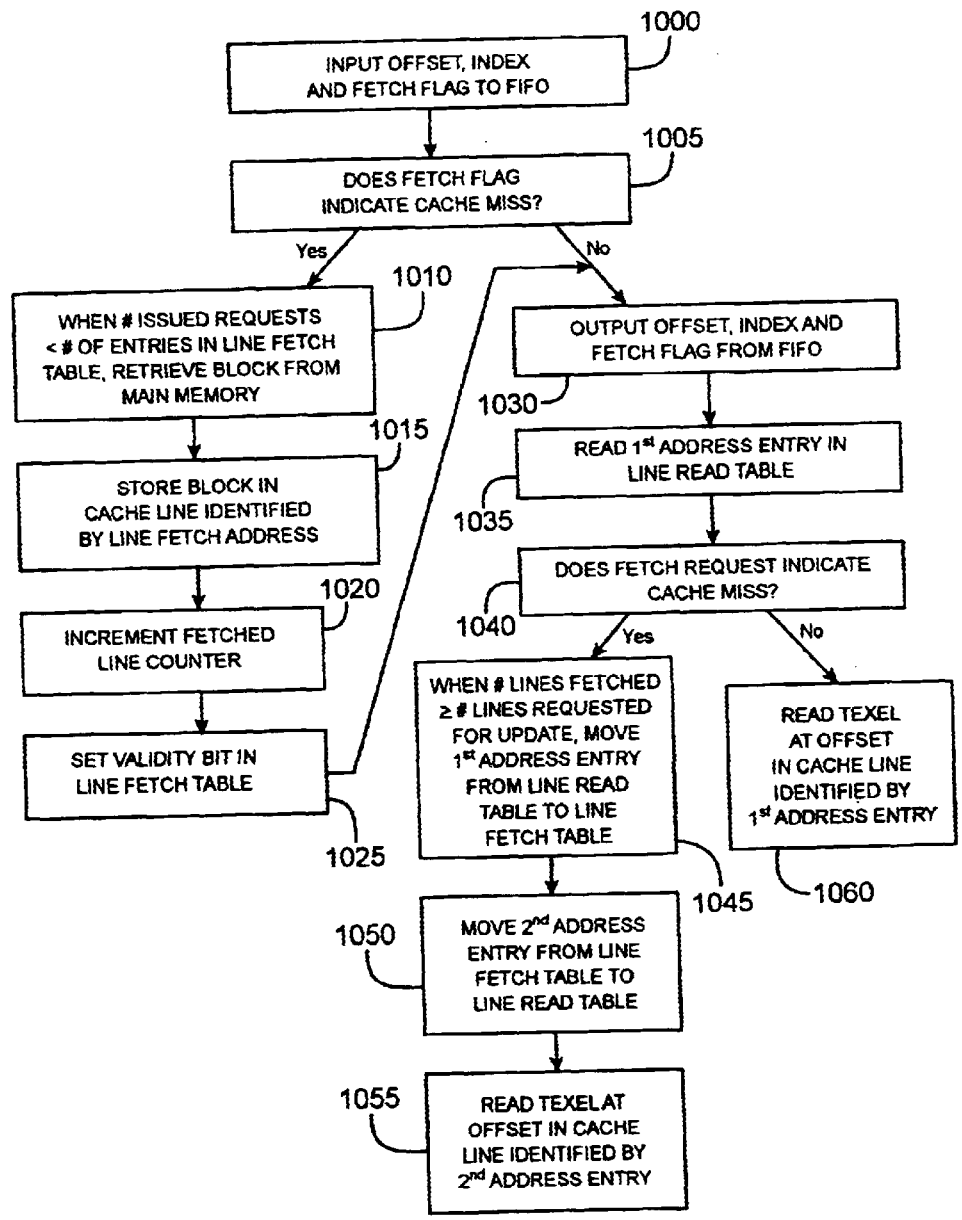
FIG. 10 illustrates a flow chart for a texture cache controller consistent with an embodiment of the present invention.

FIG. 10 is a flow chart of the operation of a texture cache controller and manager, as well as related circuitry as performed by one embodiment of the present invention. An address including an offset and index portion, and a fetch flag are provided to a FIFO or other storage device in act 1000. For example, the other storage device could be a plurality of registers, a plurality of flip-flops, an SRAM, a plurality of shift registers, and the like. If the fetch flag indicates a cache miss in act 1005, the required texel information is retrieved from the main memory in act 1010. In one embodiment of the present invention, an issued request counter is included. This counter is incremented when a request for a cache line update is made, and decremented when a read table update is completed. This counter tracks the number of update requests present in the FIFO. If the issued request count is less than the number of entries in the line fetch table, then there is at least one cache line which may be updated, so the block may be retrieved from the main memory. If there are no cache lines available for updating, the block is not retrieved until a cache line is freed up by a line read table update.

The required texel information is generally retrieved in a block, where a block has a number of bits which corresponds to the number of bits in a cache line in the texture cache. In one embodiment of the present invention, each cache line holds 32 texels, each 2 bytes long, for a total of 64 bytes of data per cache line. Therefore, data is retrieved from the main memory in act 1010 in 64 byte blocks. Alternately, other size blocks and cache lines may be used, and the size of blocks retrieved from the main memory and the size of the cache lines may have different values, though in a preferred embodiment they will be the same.

In act 1015 the block is stored in a cache line which is identified by a line fetch address. The line fetch address may simply be the next available address entry in a second look-up table. The fetched line counter is incremented by one in act 1020. The fetched line counter may be provided to a texture cache manager or other appropriate circuitry and be used to ensure that there are not more cache lines retrieved from the main memory than can be identified using the line fetch look-up table. The second look-up table may be referred to as the line fetch table.

After this, texels will continue to be processed, until the address including an offset and index, and fetch flag from act 1000 are output from the FIFO in act 1030. The index is read, and a corresponding first address entry in a first look up table is read in act 1035. This first look-up table may be referred to as the line read table. The fetch flag associated with the address from the FIFO is checked to see if the cache line was updated from the main memory. If not, then the required texel is found in the cache line identified by the first address entry found in the first look-up table, at the location identified by the offset signal, and is read in act 1060.

If the required texel was retrieved during a cache line update while the address was moving through the FIFO, then the first address entry found in the first look-up table is moved to the second look-up table in act 1045. In one embodiment of the present invention, a fetched line counter is used. This counter is incremented when a line is pre-fetched from the main memory, and decremented when a line read table update occurs. This counter tracks the number of line fetch table entries holding cache lines addresses of cache lines containing valid data. If the count is greater than or equal to the number of lines indicated in the fetch request in act 1040, there are enough cache line updates to provide the correct texels. The first address entry (or entries) are moved from the line read table to the line fetch table in act 1045. If the count is less than the number of updates indicated in the fetch request in act 1040, downstream processing is stalled, until a sufficient number of cache lines are updated.

In one embodiment of the present invention the second look-up table is the functional equivalent of a FIFO, where address entries from the first look-up table enter the FIFO, and the line fetch address is the address at the output of the FIFO. As above, the top entry in the line fetch table identifies the cache line to be used for the next cache line update. since the first address entry is input to the second look-up table, a second address entry, the line fetch address, is output. This second address entry is then moved into the spot in the first look-up table vacated by the first address entry in act 1050. In this way, the first look-up table correctly identifies the cache line specified by the index portion of the address output from the FIFO as being stored in cache at the second address entry. The required texel is then found in the cache line identified by the second address entry at the offset specified by the offset portion of the address output from the FIFO.

The flow chart of FIG. 10 may be implemented by circuitry, for example circuitry such as what is described and shown in other figures herein. Alternately this flow chart could be implemented as an algorithm in software. Alternately, a combination of software and hardware, or firmware could be used. Acts 1010 through 1025 are performed by the texture cache manager, while acts 1030 to 1055 are performed by the texture cache controller. The two sets of acts are therefore decoupled from each other by the FIFO, and are therefore in a sense asynchronous.

Figure 11:
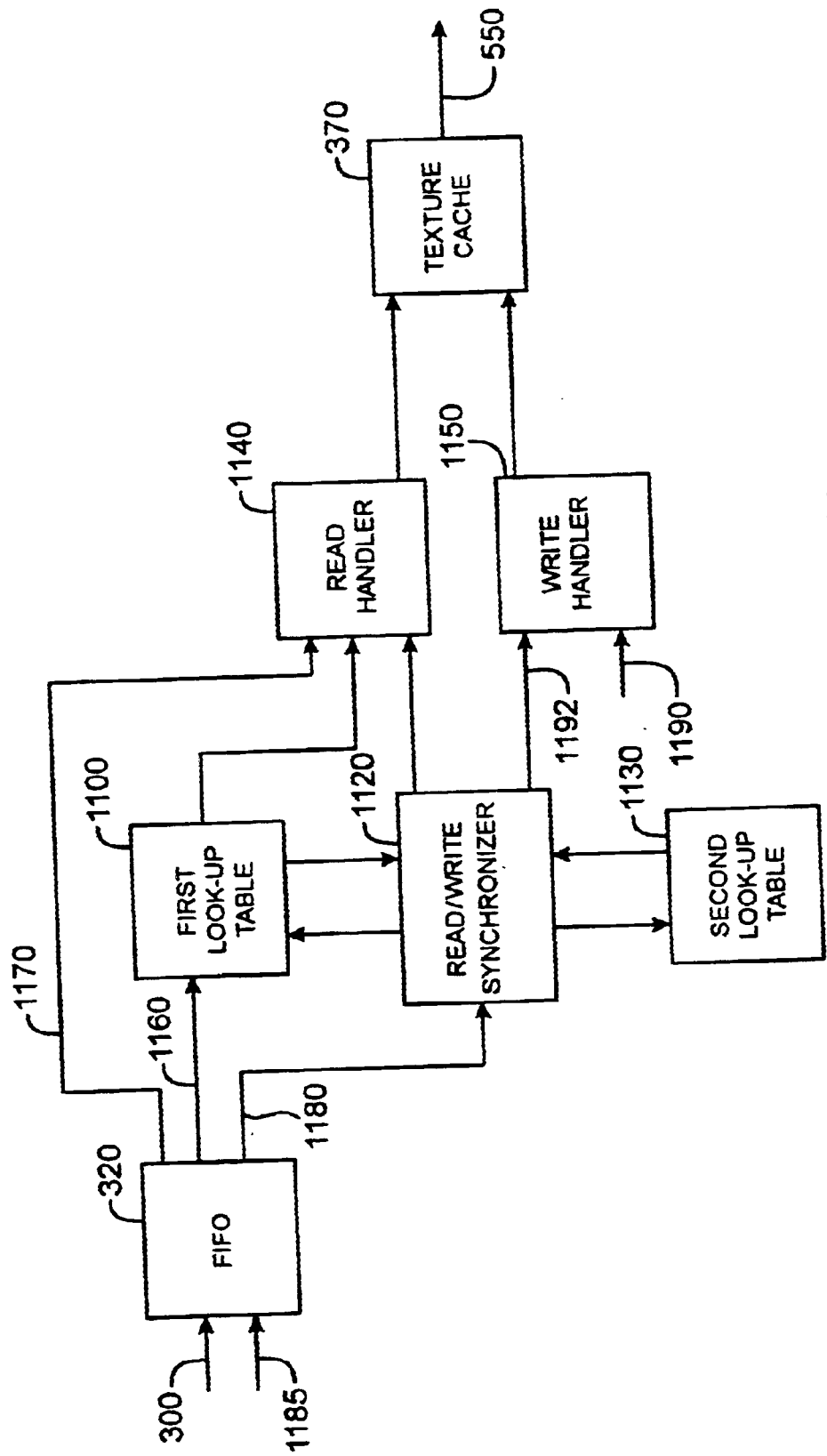
FIG. 11 illustrates a block diagram for a texture cache controller used by an embodiment of the present invention.

FIG. 11 is a block diagram of a portion of a texture cache controller and related circuitry for a further embodiment of the present invention. Included is a FIFO 320, first look-up table 1100, second look-up table 1130, synchronizer or read/write synchronizer 1120, read handler 1140, write handler 1150, and texture cache 370. Addresses are received by the FIFO 320 on address bus 300. A corresponding fetch flag is provided to the FIFO 320 on line 1185. An active fetch flag indicates a cache miss, meaning that data has been requested from the main memory in order to update the appropriate cache line.

If the fetch flag on line 1185 is active, the fetch flag indicates a cache miss has occurred, and the memory controller is instructed to retrieve from the main memory the data block having the same tag as the address on bus 300. Some number of cycles later, the data is present on bus 1190 and provided to the write handler 1150. The read/write synchronizer 1120 reads a data address entry from the second look-up table 1130, and provides the address to the write handler 1150. The write handler, having data on bus 1190 and an address on bus 1192, instructs the texture cache to write the data on bus 1190 in the cache line identified by the address on bus 1192.

The FIFO 320 has a depth associated with it, where the depth is the number of addresses it may hold. For example, one embodiment of the present invention includes a FIFO with a depth of 512 addresses. Alternately, depths of 216, 1024, or other integer values may be used. If a depth of 512 is used, and 200 addresses have are present in the FIFO, a new address input to the FIFO is available at the output 200 clock cycles later. The address output will be divided into an offset signal on bus 1170, and index signal on bus 1160. The associated fetch flag is provided by the FIFO 320 on line 1180.

There is no need to include the tag portion of the address with the index and offset stored in the FIFO. The index signal uniquely identifies a location in the first look-up table 1100 Also, the fetch flag indicates whether there is a match between the tag associated with the index signal on bus 1160 and the tag associated with the location identified by the index signal in the first look-up table 1100. Therefore, since the fetch flag indicates whether the tags match, there is no need to store the tag in the FIFO.

The index signal on bus 1160 is read by the first look-up table 1100, and a corresponding address entry is found. The first look-up table 1100 may be comprised of an array of storage elements, having a number of labeled elements, the number of labeled elements being 2 to the power of n, where n is the number of bits on the index signal on bus 1160. Alternately, the first look-up table 1100 may be comprised of an array of storage elements, having a number of labeled elements, the number of labeled elements being less than 2 to the power of n. Each storage element may store an address entry, where the address entry is an address for any of the cache lines in texture cache 370.

One embodiment of the present invention has 6 bits of index address on bus 1160, which uniquely identifies one of 2 to the power of 6, or one of 64 storage elements in the first look-up table 1100. The texture cache has 68 cache lines with 68 unique addresses, which is more than may be directly addressed by the index signal on bus 1160. The four (68 less 64) cache line addresses not stored in a storage element in the first look-up table 1100, are stored in a second look-up table 1130. The second look-up table 1130 may be configured to function as a FIFO, storing the four addresses not available in the first look-up table 1100. The cache may be implemented as a dual port memory, such that a first texel in a first data block stored in a first cache line may be read simultaneously with a second data block being written to a second cache line. The number of extra cache lines can be optimized given the frequency of cache misses in a given implementation. Alternately, a 5 bit index signal may be used, which uniquely identifies one of 2 to the power of 5, or one of 32 sets of storage elements in the first look-up table 1100, where each set contains two cache lines. Also, a 6−n+1 bit index may be used for an n-way associative cache, where each index signal identifies a set containing n cache lines. The cache may alternately be fully associative, or direct. The exact number of cache lines used, the number stored in the first and second look-up tables, and the cache architecture can vary, the examples here are for illustrative purposes only, and are not intended to limit the claims appended below.

If the fetch flag on line 1180 is not active, the read/write synchronizer 1120 will instruct the first look-up table 1100 to pass the address entry identified above by the index signal on bus 1160 to the read handler 1140. The read handler will also take the offset portion of the address, which is on bus 1170, and identify a desired texel in texture cache 370. The desired texel is then output on texel bus 550, and provided to the texture filter.

If the fetch flag on line 1180 is active, then the read/write synchronizer 1120 will swap the address entry identified above by the index signal on bus 1160 with the top address in the second look-up table 1130. The index signal on bus 1160 now identifies a location in cache, and passes that location to the read handler 1140. The read handler 1140 also receives the offset portion of the address on bus 1170. The read handler identifies the cache line in texture cache 370, and uses the offset to find the required texel in the cache line, and directs the texture cache 370 to provide the required texel on texel bus 550. In one embodiment of the present invention, the fetch flag or request on line 1180 may indicate whether 1, 2, 3, or 4 lines need to be updated. If 2 lines need to be updated, then two entries from the line fetch table are moved to the line read table, and two entries from the line read table are moved to the line fetch table.

Figure 12:
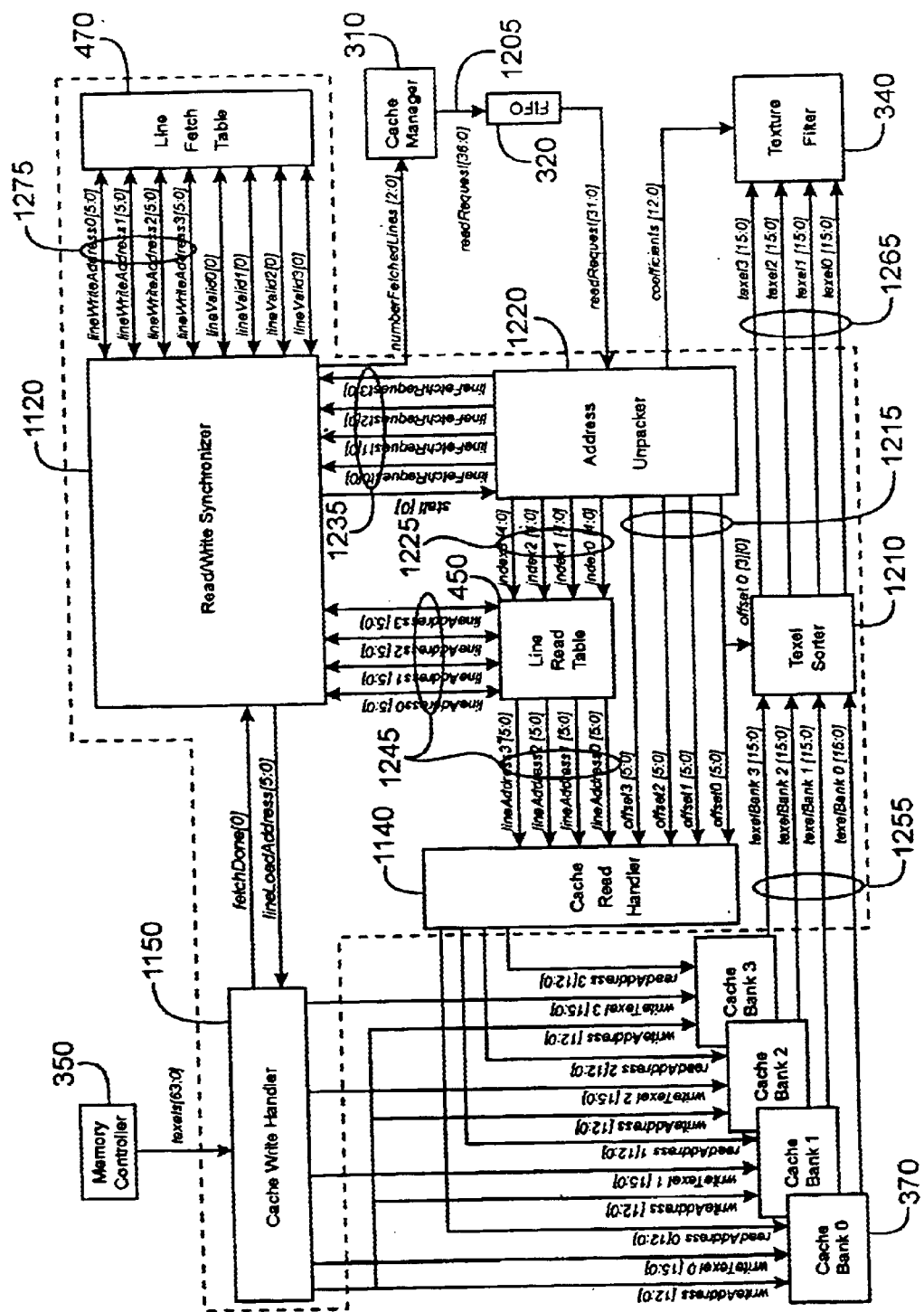
FIG. 12 is a detailed block diagram illustrating a texture cache controller used by an embodiment of the present invention.

FIG. 12 is a more complete block diagram of a texture cache controller and related circuitry as used by a system consistent with one embodiment of the present invention. Included are a memory controller 350, cache write handler 1150, read/write synchronizer 1120, line fetch table 470, cache manager 310, cache read handler 1140, texture cache 370, shown as four individual cache banks 0–3, texel sorter 1210, line read table 450, address unpacker 1220, and texture filter 340. Using four individual cache banks allows each bank to supply one texel on each clock cycle.

The cache manager 310 provides a readRequest signal, including an offset signal and index signal, on bus 1205. The FIFO 320 stores the readRequest signals, and outputs them to the address unpacker 1220. The address unpacker 1220 unpacks the readRequests into offset signals, index signals, and line fetch requests. The offset signals are sent on lines 1215, the index signals are provided on buses 1225, and the line fetch requests are available to the read/write synchronizer 1120 on buses 1235. Four sets of each of these signals are made available, one for each of the four banks 0–3 in texture cache 370. The index signals on lines 1225 are provided to the line read table 450. The line read table uses the index signal to look up a line address, and provides that address on lines 1245.

In situations where the line fetch request signal is inactive, the cache read handler 1140 reads the provided line address and offset, and selects a texel or texels from texture cache 370. These texels are provided to the texel sorter 1210 on lines 1255. The texel sorter 1210 arranges the texels and provides them to the texture filter 340 on lines 1265. In one embodiment of the present invention, the fetch request may indicate whether 1, 2, 3, or 4 lines need to be updated. If 2 lines need to be updated, then two entries from the line fetch table are moved to the line read table, and two entries from the line read table are moved to the line fetch table.

Where the line fetch request is active, the read/write synchronizer 1120 will swap the line address in the line read table 450 for the line write address in line fetch table 470, which are provided on buses 1275. Specifically, the line write address, or line fetch address, is moved from the line fetch table 470 to the line read table 450, and the line address is moved from the line read table 450 to the line fetch table 470. The updated line address and offset signals, on lines 1245 and 1215 respectively, are used by the cache read handler to provide texels to the texel sorter 1210.

Cache line updates are done by the read/write synchronizer 1120 sending a line write address to the cache write handler 1150. The cache write handler 1150 in turn receives data from the memory controller 350, and provides addresses and write data to the texture cache 370. In one implementation, two texels of 2 bytes each can be written to each cache bank. The same address is sent to each cache bank, for 16 bytes total. Therefore, a 64 byte cache line will take 4 clock cycles to write to cache.

Embodiments of the present invention have been explained with reference to particular examples and figures. Other embodiments will be apparent to those of ordinary skill in the art. Therefore, it is not intended that this invention be limited except as indicated by the claims.

What is claimed is:

1. A cache memory apparatus comprising:
    a cache memory having a first number of cache lines, each cache line having a cache line address, and coupled to a first address bus;
    a second address bus configured to provide a second number of index signals;
    a first plurality of storage elements coupled between the first address bus and the second address bus and configured to translate each of the second number of index signals to one of a first number of cache line addresses; and
    a second plurality of storage elements coupled to the first plurality of storage elements, the second plurality of storage elements configured to store a third number of cache line addresses,
    wherein the second number is less than the first number.

2. The apparatus of claim 1 wherein the second number summed with the third number is equal to the first number.

3. The apparatus of claim 2 further comprising a read queue coupled to the second address bus, wherein the read queue outputs index signals and corresponding fetch bits.

4. The apparatus of claim 3 wherein the first plurality of storage elements accepts the index signals on the second address bus and outputs cache line addresses on the first bus, and wherein each index signal selects one of the first plurality of storage elements.

5. The apparatus of claim 4 wherein the cache memory further comprises a write port for sequentially updating the cache lines, wherein the write port comprises a third address bus and a first data bus.

6. The apparatus of claim 5 wherein the third address bus couples to the second plurality of storage elements, and wherein the second plurality of storage elements provide on the third address bus the cache line addresses of the cache lines to be sequentially updated.

7. The apparatus of claim 4 wherein the cache memory further comprises a read port for sequentially reading the cache lines, wherein the read port comprises the first address bus and a second data bus.

8. The apparatus of claim 7 wherein the first plurality of storage elements provides on the first address bus the cache line addresses of the cache lines to be sequentially read.

9. A cache memory apparatus comprising:
a cache memory having a first number of cache lines, each cache line coupled to a first address bus;
a second address bus;
a first plurality of storage elements coupled between the first address bus and the second address bus;
a second plurality of storage elements coupled to the first plurality of storage elements, wherein the first plurality of storage elements stores a second number of cache line addresses, the second plurality of storage elements stores a third number of cache line addresses, and the second number summed with the third number is equal to the first number;
a read queue coupled to the second address bus, wherein the read queue outputs index signals and corresponding fetch bits, wherein the first plurality of storage elements accepts the index signals on the second address bus and outputs cache line addresses on the first bus, and wherein each index signal selects one of the first plurality of storage elements; and
a synchronizer, wherein if a fetch bit is active the synchronizer replaces a cache line address selected by the index signal that corresponds to the active fetch bit with a second cache line address stored in the second plurality of storage elements, and the synchronizer replaces the second cache line address stored in the second plurality of storage elements with the cache line address selected by the index signal.

10. A cache memory apparatus comprising:
a cache memory having a first number of cache lines, each cache line addressable by a cache line read address and a cache line write address;
a first plurality of storage elements for receiving address information and for storing and providing a second number of cache line read addresses to the cache memory; and
a second plurality of storage elements for storing and providing a third number of cache line write addresses to the first plurality of storage elements,
wherein the second number summed with the third number is equal to the first number,
the address information comprises index signals and corresponding fetch bits,
the first plurality of storage elements converts the index signals into cache line read addresses, and each index signal selects one of the first plurality of storage elements, and
if a fetch bit is active, the cache line read address selected by the index signal corresponding to the fetch bits is replaced by a second cache line write address stored in the second plurality of storage elements, and the second cache line write address stored in the second plurality of storage elements is replaced by the cache line road address selected by the index signal.

11. The apparatus of claim 10 wherein the cache memory further comprises a write port for receiving the cache line write addresses from the second plurality of storage elements.

12. The apparatus of claim 10 wherein the cache memory further comprises a read port for receiving the cache line read addresses from the first plurality of storage elements.

13. A method of reading data from a cache line comprising:
providing an address comprising an index;
providing a fetch status, capable of having a value; and
if the fetch status has a first value, translating the index to a first cache line address and reading data from a cache line identified by the first cache line address,
else replacing the first cache line address with a second cache line address, translating the index to the second cache line address and reading data from a cache line identified by the second cache line address.

14. The method of claim 13 wherein there are a first number of cache lines, a second number of available first cache line addresses, and a third number of available second cache line addresses, and
wherein the sum of the second number and the third number is equal to the first number.

15. The method of claim 14 wherein the second number of available cache line addresses are stored in a first plurality of storage elements, and the third number of available cache line addresses are stored in a second plurality of storage elements.

16. A computer system comprising:
a central processing unit (CPU);
a main memory coupled to the CPU; and
a cache memory apparatus as set forth in claim 1, coupled to the CPU.

17. A cache system comprising:
a read queue, capable of queuing a plurality of index signals and corresponding fetch bits;
a cache comprising a first number of cache lines;
a first table coupled to the read queue comprising a second number of storage elements, wherein each storage element contains a cache line address;
a second table comprising a third number of storage elements, wherein each storage element contains a cache line address;
a synchronizer, coupled between the first table and the second table; and further coupled to the read queue;
a read handler, coupled between the first table and the cache; and
a write handler, coupled between the synchronizer and the cache.

18. The cache system of claim 17 wherein each index signal selects one of the second number of storage elements.

19. The cache system of claim 18 wherein the second number summed with the third number is equal to the first number.

20. The cache system of claim 19 wherein the synchronizer receives fetch bits, and if a fetch bit is active, replaces the one of the second number of storage elements selected by the index signal with one of the third number of storage elements, and replaces one of the third number of storage elements with the one of the second number of storage elements selected by the index signal.

21. The cache system of claim 20 wherein the write handler receives cache line addresses from the synchronizer and selects one of the first number of cache lines for updating.

22. The cache system of claim 21 wherein the read handler receives cache line addresses from the first table and selects one of the first number of cache line for reading.

23. A method of reading data from a texture cache comprising:
  providing a portion of a first address of a first main memory location to a first-n-first-out memory;
  determining if data at the first main memory location is stored in the texture cache;
  receiving the portion of the first address from the first-in-first-out memory with a line read table;
  if it is determined that data at the first main memory location is stored in the texture cache, then, using the line read table, translating the portion of the first address to a first address of the texture cache memory; else
  updating the Line read table, then using the line read table, translating the portion of the first address to a second address of the texture cache memory.

24. The method of claim 23 wherein if it is determined that data at the first main memory location is not stored in the texture cache, then prefetching data from the first main memory location and storing it in the second address of the texture cache memory.

25. The method of claim 24 wherein the prefetching of data is done by providing the portion of the first address to a prefetch first-in-first-out memory.

26. The method of claim 24 wherein the updating the line read table is done by swapping an entry in the line read table with an entry in a line fetch table.

27. A method of reading data from a texture cache comprising:
  buffering portions of addresses and corresponding fetch bits using a first-in-first-out memory, each fetch bit indicating whether data at the corresponding address is available in the texture cache;
  providing each of the portions of addresses to a first look-up table, and if a corresponding fetch bit indicates that data at the corresponding address is available in the texture cache, translating that portion of address to a first texture cache memory address; else
  updating the first look-up table using an entry in a second look-up table and translating the that portion of address to a second texture cache memory address.

28. The method of claim 27 wherein the second look-up table is another first-in-first-out memory.

29. The method of claim 28 wherein the first look-up table comprises a first number of entries, the second look-up table comprises a second number of entries, and the texture cache memory comprises a third number of lines,
  and wherein the first number plus the second number equal the third number.

30. A method of reading data from a cache comprising:
  receiving portions of memory addresses;
  using one level of indirection by translating the received portions of the memory addresses to cache line addresses, wherein the received portions of the memory addresses are not translatable to a first plurality cache line addresses; and
  reducing overwriting of data by storing prefetched data at the first plurality of cache line addresses.

31. The method of claim 30 wherein the translating the received portions of the memory addresses to cache line addresses is done using a first look-up table and the first plurality of cache line addresses are stored in a second look-up table, and
  wherein when prefetched data stored at one of the first plurality of cache line addresses is needed, an entry in the first look-up table is swapped with an entry in the second look-up table.

* * * * *